(12) United States Patent
Shabtay et al.

(10) Patent No.: US 7,606,203 B1
(45) Date of Patent: Oct. 20, 2009

(54) PACKET/OCTET LOSS MEASUREMENT FOR BRIDGING DOMAINS

(75) Inventors: Lior Shabtay, Ganai Tikva (IL); Sergei Kaplan, Rechovot (IL)

(73) Assignee: Atrica Israel Ltd., Hod Hasharon (IL)

( * ) Notice: Subject to any disclaimer, the term of this patent is extended or adjusted under 35 U.S.C. 154(b) by 1125 days.

(21) Appl. No.: 10/631,451

(22) Filed: Jul. 30, 2003

(51) Int. Cl.
*H04W 4/00* (2006.01)
(52) U.S. Cl. ............... 370/332; 370/496; 370/252; 370/413; 370/473
(58) Field of Classification Search ......... 370/332, 370/389, 252, 400, 395.42, 312, 328, 496, 370/230; 702/100; 455/452, 414.1, 446
See application file for complete search history.

(56) References Cited

U.S. PATENT DOCUMENTS

| 6,188,674 | B1 * | 2/2001 | Chen et al. ............... 370/252 |
| 6,643,612 | B1 | 11/2003 | Lahat et al. ............... 702/186 |
| 2003/0002511 | A1 * | 1/2003 | Ohba et al. ............... 370/400 |
| 2004/0066780 | A1 * | 4/2004 | Shankar et al. ............ 370/389 |
| 2004/0190557 | A1 * | 9/2004 | Barron ..................... 370/496 |

OTHER PUBLICATIONS

Martini et al., "Encapsulation Methods for Transport of Ethernet Frames Over IP/MPLS Networks", draft-ietf-pwe3-ethernet-encap-03.txt, Jun. 2003.

Lasserre et al., "Virtual Private LAN Services over MPLS", draft-lassarre-vkompella-ppvpn-vpls-04.txt, Mar. 2003.

Santitoro et al., "Ethernet Service Definitions—Phase I", Metro Ethernet Forum, Apr. 2, 2003.

Paxson, "Framework for IP Performance Metrics", RFC 2330, May 1998.

Koodli, "One-way Loss Pattern Sample Metrics", RFC 3357, Aug. 2002.

* cited by examiner

*Primary Examiner*—Lester Kincaid
*Assistant Examiner*—Michael T Vu
(74) *Attorney, Agent, or Firm*—Zaretsky Patent Group PC; Howard Zaretsky (57) ABSTRACT

An apparatus for and method of packet loss measurement for TLS connections in an MEN that overcomes the problems of the prior art. The mechanism is operative to ensure that only one copy of each received packet is counted when exiting the TLS connection (unless dropped along the path due to congestion, etc.), so that the number of egress packets counted can be accurately compared with the number of ingress packets counted. Only a single copy of each packet is marked, i.e. flagged, at ingress. Any bridging along the path that needs to duplicate the packet forwards only a single marked copy of the packet. All other copies are forwarded unmarked. At the egress from the TLS, only marked packets are counted by the egress counter. In a second embodiment, a duplication field is inserted into each packet to better track all the duplicate copies of a packet.

30 Claims, 6 Drawing Sheets

PACKET/OCTET LOSS MEASUREMENT FOR BRIDGING DOMAINS

FIELD OF THE INVENTION

The present invention relates to the field of data communications and more particularly relates to an apparatus for and method of packet and/or octet loss measurement for bridging domains such as Transparent LAN Services (TLS) in Metro Ethernet Networks (MENs).

BACKGROUND OF THE INVENTION

The growth in demand for telecommunication services is increasing at an ever-quickening pace. The majority of the demand is being driven by the explosion in the use of the Internet and a steady stream of new applications being introduced which further increases the demand for increased bandwidth. Currently, a large portion of the Internet traffic is still carried by circuit switched transport facilities. In the case of Metropolitan Area Networks (MANs), most of the traffic is transported over SONET/SDH based networks most of which were originally resigned for voice traffic. With time, more and more customers are using the networks for transporting data rather than voice.

The requirements for networked communications within the user community have changed dramatically over the past two decades. Several notable trends in the user community include (1) the overwhelming domination of Ethernet as the core networking media around the world; (2) the steady shift towards data-oriented communications and applications; and (3) the rapid growth of mixed-media applications. Such applications include everything from integrated voice/data/video communications to the now commonplace exchanges of MP3 music files and also existing voice communications which have begun to migrate towards IP/packet-oriented transport.

Ethernet has become the de facto standard for data-oriented networking within the user community. This is true not only within the corporate market, but many other market segments as well. In the corporate market, Ethernet has long dominated at all levels, especially with the advent of high-performance Ethernet switching. This includes workgroup, departmental, server and backbone/campus networks. Even though many of the Internet Service Providers (ISPs) in the market today still base their WAN-side communications on legacy circuit oriented connections (i.e. supporting Frame Relay, xDSL, ATM, SONET), their back-office communications are almost exclusively Ethernet. In the residential market, most individual users are deploying 10 or 100 Mbps Ethernet within their homes to connect PCs to printers and to other PCs (in fact, most PCs today ship with internal Ethernet cards) even though the residential community still utilizes a wide range of relatively low-speed, circuit-oriented network access technologies.

The use of Ethernet, both optical and electrical based, is increasing in carrier networks due to the advantages of Ethernet and particularly Optical Ethernet, namely its ability to scale from low speeds to very high rates and its commodity-oriented nature. With the rapid increase in the demand for user bandwidth, and the equally impressive increase in the performance of Ethernet with the LAN environment, the demand for Metropolitan network performance is rapidly increasing. In response, there has been a massive explosion in the amount of fiber being installed into both new and existing facilities. This is true for both the corporate and residential markets.

Transparent LAN Service (TLS), which is also referred to as multipoint-to-multipoint (MP2MP), has been identified as one of the key services to be provided by an Ethernet based metro network. A TLS that provides virtual Ethernet LAN service is called an E-LAN (Ethernet LAN service) in Metro Ethernet Forum (MEF) standard specifications. TLS implementation in MPLS networks is referred to as Virtual Private LAN Service (VPLS) in Internet Engineering Task Force (IETF) drafts.

A TLS creates an emulated LAN segment for a given set of users. It provides a layer 2 broadcast domain that is capable of learning and forwarding using Ethernet MAC addresses for a given set of users.

Today, Ethernet is the predominant technology used for Local Area Network (LAN) connectivity and is gaining acceptance as an access technology as well. This is true especially in Metropolitan Area Networks (MANs) and Wide Area Networks (WANs). In a typical scenario, an Ethernet port connects a customer to the Provider Edge (PE) device. Customer traffic is subsequently mapped to a specific MPLS-based Layer 2 Virtual Private Network (VPN).

Traditional LANs provide unicast, broadcast and multicast services. Locations that belong to the same broadcast domain and that are connected via an MPLS network expect broadcast, multicast and unicast traffic to be forwarded to the proper locations. This requires MAC address learning on a per LSP basis, forwarding unicast destination traffic according to the learned information, packet replication across LSPs for multicast/broadcast traffic and for flooding of unknown unicast destination traffic.

A main goal of Virtual Private LAN Services (VPLS) is to provide connectivity between customer sites situated in the MAN or WAN as if they were connected via a LAN. To accomplish this, a major attribute of Ethernet must be provided, namely the flooding of broadcast traffic and traffic with unknown destination MAC addressed to all ports. To provide flooding within a TLS, all unicast unknown address, broadcast and multicast frames are flooded over the corresponding "pseudowires" to all relevant provider edge nodes that participate in the TLS. Note that multicast packets are a special case and are not necessarily flooded to all VPN members. A pseudowire is a made up of a pair of unidirectional virtual circuit Label Switched Paths (LSPs). Throughout this document, the term pseudowire is used to denote a point-to-point logical link connecting different nodes in the network, regardless of the technology used for its implementation, e.g., MPLS, etc. Depending on the technology, the pseudowire may be an MPLS-VC, a point-to-point VLAN-based trail, an ATM-VC, etc.

A provider edge node uses different techniques to associate packets received from the client with connections. Example techniques include port mapping and VLAN mapping in which the received packet is associated with a connection according to the provider edge device port from which it was received or according to the port from which it was received as well as the VLAN with which it is tagged, respectively. Packets mapped to a TLS connection, are forwarded to one or more of the sites associated with that particular TLS connection. In case of a TLS connection, the forwarding is performed by bridging-capable nodes throughout the network, that bridge between pseudowires dedicated to that TLS. The pseudowires are point-to-point 'sub-connections' of that TLS, functioning to connect the bridging-capable nodes. These bridging capable nodes must be able to first associate the received packet with a TLS and then, within the context of the TLS, associate a destination MAC address (or a destination MAC-address and VLAN-tag value) with a pseudowire comprising that TLS in order to forward a packet. It is not practical to require these provider nodes to statically configure an association of every possible destination MAC address with a pseudowire. Thus, a bridging mechanism is required to dynamically learn MAC addresses (or MAC-address and VLAN pairs) on both physical ports and virtual circuits and to forward and replicate packets across both physical ports and pseudowires to which they are associated.

The Ethernet LAN Service (E-LAN Service) is defined by the MEF as a service that provides multipoint connectivity, i.e. it may connect two or more UNIs. Subscriber traffic sent from one UNI can be received at one or more of the other UNIs. In the simplest case, each site (UNI) can be set up to be a member of the same Virtual LAN (VLAN). As new UNIs (i.e. sites) are added, they can be made members of the same VLAN thus simplifying provisioning and service activation.

Bridging functionality operates on the original Layer 2 portion of the packet. The bridge functions to learn new source MAC addresses of ingress packets and to associate them with the outbound pseudowire it is to be sent out on.

Various techniques can be used to provide the forwarding functionality in a TLS. One technique is known as spanning-tree based transparent bridging as described in the IEEE 802.1 standard. In this bridging technique the nodes in the network connect through a tree of point-to-point pseudowires. Standard bridging is performed between them using the pseudowires between them as links over which bridging is performed.

A second bridging technique is a variation of the first one described above and is known as split-horizon bridging in which each endpoint of the TLS is connected through a point-to-point pseudowire to each of the other components. Each endpoint performs a bridging decision as to whether to forward each packet to a specific destination through the point-to-point pseudowire leading to it, or to forward the packet to all or some of the destinations (i.e. through all or some of the point-to-point pseudowires). Thus, all bridges are connected in a full mesh pattern whereby packets pass at most only two bridges. A disadvantage of this technique is that it is not scalable and thus requires a large number of pseudowires as the TLS size increases (in the number of endpoints).

A third technique known as link redundancy uses a single bridging device connected in a dual-homed fashion to a bridging domain using two different pseudowires. The device chooses one of the pseudowires for working at any single point in time.

Note that a single TLS service may be constructed from a number of domains, each implemented using one of the bridging techniques described above.

It is commonly required that provider networks provide packet loss measurements for the transport facilities they provide. Customers typically want information on the number of packets that did not make it to their destination. The end-to-end Service Level Agreement (SLA) measurement protocol described in U.S. Pat. No. 6,643,612 to Lahat et al., entitled "Mechanism And Protocol For Per Connection Based Service Level Agreement Measurement," incorporated herein by reference in its entirety, provides very accurate calculation of delay, jitter and packet/octet loss for point-to-point connections.

This SLA measurement protocol, however, does not work very well for calculating packet/octet loss for TLS connections. This is because the endpoints of the TLS do not typically maintain per endpoint pair counters. Rather, they only maintain per connection counters of how much traffic was sent and how much traffic was received from the network over a particular connection. The endpoints are not capable of maintaining per endpoint pair counters, i.e. counters at endpoint A indicating how many packets/octets were sent to node B and how many of the received packets were originally sent from node B. The main reason is that node A does not know which is the destination of a packet transmitted over a TLS, since this is decided by the bridging nodes along the way. Further it does not know the origin of the packets it receives. There is an additional problem of scalability to maintain such a large number of counters. Thus, comparing counters at the two ends of a connection (e.g., nodes A and B) such as is done in Lahat et al. cannot be used to measure packet loss for TLS connections.

Thus when a user sends a packet to a provider edge device, they do not know whether the packet will be duplicated in the TLS bridge and forwarded to some or all other end-points of that TLS. Although the packet may have been received once by a single provider edge device, it may be duplicated and forwarded to some or all of the users on the TLS. Packet loss measurements even for unicast are not accurate since it is not known whether each TLS bridge along the way has already learned the forwarding information for the destination MAC-address of each unicast received (and whether it has deleted this information in an aging process). If it has, it will find the MAC address in its tables and will forward it to a single pseudowire. If the bridge does not find the MAC address in its tables, then the packet will be duplicated and flooded to all the other pseudowires connected to it that comprise that TLS. Thus, taking the difference of the sum of all packets going into and out of the TLS will not yield accurate results due to the duplication of packets by the bridges comprising that TLS.

One solution is to use a statistical approach as suggested in a draft paper proposed to the MEF in the course of work on OAM for Ethernet services. In this approach, packet loss is measured in bridging domains (e.g., a TLS) by periodically sending Operation, Administration & Maintenance (OA&M) messages between the bridging domains and counting the messages that arrive successfully. The problem with this approach is that it yields only a rough estimate and not an actual measurement of packet loss. In addition, the estimate is made between two specific endpoints. A scalability problem arises if a global estimation of packet loss for the TLS is desired, as a prohibitively large number of OA&M messages must be periodically sent.

SUMMARY OF THE INVENTION

The present invention is an apparatus for and method of packet loss measurement for TLS connections in an MEN that overcomes the problems of the prior art. The mechanisms of the present invention overcomes the difficulty in providing packet loss measurements due to the fact that packets received by a TLS connection from a customer edge device over a UNI may be duplicated by the bridging domain within the TLS connection and sent out of more than one UNI towards other customer edge devices. The mechanism is operative to ensure that only one copy of each packet received is counted when exiting the TLS connection (unless dropped along the path due to congestion, etc.), so that the number of egress packets counted can be accurately compared with the number of ingress packets counted.

In a first embodiment, each packet is marked upon ingress with a flag or bit to indicate it is to be counted upon egress from the TLS. Bridges along the path duplicate and forward the packet in accordance with regular bridging standards. If the packet is to be duplicated, the bridges are adapted to mark only one of the duplicated packets. Thus, only a single marked packet is forwarded. The remaining duplicate packets are forwarded unmarked. Upon exiting the TLS, only marked packets are counted at the egress UNI. The unmarked packets are not counted.

In a second embodiment, the single bit flag is replaced by a multibit field that is used to store a duplication value. In operation, the duplication field is initialized to a certain value. If the packet is to be duplicated in a bridge, the duplication value is divided by the number of copies to be made. The new divided values are written into the duplication field of each packet. Upon exiting the TLS, the duplication values are counted by the egress counters. This mechanism provides packet loss measurements that are more accurate than those calculated using only a single bit flag.

The present invention is suitable for use in networks that require packet loss measurements wherein the networks perform bridging including the flooding of broadcast, multicast and unknown traffic. In particular, the invention is applicable in provider edge and core switches in Metropolitan Area Networks (MANs) that implement TLS connections VPLS connections or any other bridged network connections. Note that the invention is applicable in any network that employs bridging domains including TLS connections in MENs and bridged LAN networks such as based on standard Ethernet.

It is important to also note that the invention is not limited by the type of network in use, the PHY layer, the type of signaling in use or by whether provisioning is based on signaling or performed in the management plane. The invention is applicable to other networks as well.

Note also that the invention is suited for implementation in hardware such as a network processor (which may comprise a network-processor chip, an FPGA, an ASIC, etc.), adapted to implement the packet loss measurement mechanism of the present invention, software or a combination of hardware and software. In one embodiment, a network device comprising a processor, memory, etc. is operative to execute software adapted to perform the packet loss measurement mechanism of the present invention.

There is thus provided in accordance with the invention, a method of measuring packet and/or octet loss for a bridging domain, the method comprising the steps of receiving packets from a client, marking a single copy of each packet received from the client, incrementing an ingress counter once for each marked received packet, upon receipt of an unmarked packet, forwarding unmarked packets as unmarked in all copies, upon receipt of a marked packet, forwarding only one marked copy of each packet wherein all other duplicate packet copies are unmarked and incrementing an egress counter once for each marked packet exiting the bridging domain.

There is also provided in accordance with the invention, a method of measuring packet loss for a bridging domain, the method comprising the steps of receiving packets from a client, initializing a duplication field in each received packet to an initial value, incrementing an ingress counter by the initial value for each received packet, if a packet is to be duplicated, dividing the current value of its duplication field between all copies of the packet and setting the duplication field in each copied packet to the divided value and for each packet exiting a bridging domain, incrementing an egress counter by the contents of its duplication field.

There is further provided in accordance with the invention, a bridge for forwarding marked packets over Transparent LAN Services (TLS) connections in a metro Ethernet network (MEN) comprising packet receiving means for receiving marked and unmarked packets, first means for forwarding unmarked packets as unmarked in all copies upon receipt of an unmarked packet, second means for forwarding only one marked copy of each packet wherein all other duplicate packet copies are unmarked upon receipt of a marked packet, third means for forwarding one marked copy of a packet to be dropped according to standard bridging rules, if not at an exit point from the TLS and fourth means for egress counting a packet to be dropped according to standard bridging rules, if at an exit point from the TLS.

There is also provided in accordance with the invention, an edge switch for use in an Ethernet based network comprising a plurality of user ports for interfacing the edge switch to one or more users, a plurality of network ports for interfacing the edge switch to one or more communication links, a packet processor comprising ingress packet processing means and egress packet processing means, a loss measurement module for measuring packet and/or octet loss for Transparent LAN Services (TLS) connections in a metro Ethernet network (MEN), the loss measurement module comprising marking means for marking a single copy of each packet received from a user, an ingress counter adapted to be incremented once for each marked received packet, a bridge adapted, upon receipt of an unmarked packet, to forward unmarked packets as unmarked in all copies and also adapted, upon receipt of a marked packet, to forward only one marked copy of each packet wherein all other duplicate packet copies are unmarked and an egress counter adapted to be incremented once for each marked packet exiting a TLS connection.

There is further provided in accordance with the invention, an edge switch for use in an Ethernet based network comprising a plurality of user ports for interfacing the edge switch to one or more users, a plurality of network ports for interfacing the edge switch to one or more communication links, a packet processor comprising ingress packet processing means and egress packet processing means, a loss measurement module for measuring packet and/or octet loss for Transparent LAN Services (TLS) connections in a metro Ethernet network (MEN), the loss measurement module comprising marking means for marking a single copy of each packet received from a user, an ingress counter adapted to be incremented once for each marked received packet and an egress counter adapted to be incremented once for each marked packet exiting a TLS connection.

There is also provided in accordance with the invention, a core switch for use in an Ethernet based network comprising a plurality of network ports for interfacing the core switch to one or more communication links, a packet processor comprising ingress packet processing means and egress packet processing means and a loss measurement module for measuring packet and/or octet loss for Transparent LAN Services (TLS) connections in a metro Ethernet network (MEN), the loss measurement module comprising a bridge adapted, upon receipt of an unmarked packet, to forward unmarked packets as unmarked in all copies and also adapted, upon receipt of a marked packet, to forward only one marked copy of each packet wherein all other duplicate packet copies are unmarked.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| ATM | Asynchronous Transfer Mode |
| CD-ROM | Compact Disc-Read Only Memory |
| CFI | Canonical Format Indicator |
| CIR | Committed Information Rate |
| CPU | Central Processing Unit |
| CSIX | Common Switch Interface |
| DAT | Digital Audio Tape |
| DSL | Digital Subscriber Line |
| DSP | Digital Signal Processor |
| DVD | Digital Versatile Disk |
| EEPROM | Electrically Erasable Programmable Read Only Memory |
| E-LAN | Ethernet LAN Service |
| EPROM | Erasable Programmable Read Only Memory |
| FDDI | Fiber Distributed Data Interface |
| FE | Fast Ethernet |
| FPGA | Field Programmable Gate Array |
| GE | Gigabit Ethernet |
| GRE | Generic Routing Encapsulation |
| IEEE | Institute of Electrical and Electronic Engineers |
| IETF | Internet Engineering Task Force |
| IP | Internet Protocol |
| IPSEC | IP Security |
| L2TP | Layer 2 Tunneling Protocol |
| LAN | Local Area Network |
| LSP | Label Switched Path |
| LSR | Label Switched Router |
| MAC | Media Access Control |
| MAN | Metropolitan Area Network |
| MEF | Metro Ethernet Forum |
| MEN | Metro Ethernet Network |
| MP2MP | Multipoint-to-Multipoint |
| MPLS | Multi-Protocol Label Switching |
| NIC | Network Interface Card |
| NMS | Network Management System |
| OA&M | Operations, Administration & Maintenance |
| PC | Personal Computer |
| PDH | Plesiochronous Digital Hierarchy |
| PE | Provider Edge |
| PPE | Packet Processing Engine |
| RAM | Random Access Memory |
| ROM | Read Only Memory |
| RPR | Resilient Packet Ring |
| SDH | Synchronous Digital Hierarchy |
| SLA | Service Level Agreement |
| SONET | Synchronous Optical Network |
| TDM | Time Division Multiplexing |
| TLS | Transparent LAN Services |
| UNI | User to Network Interface |
| VLAN | Virtual Local Area Network |
| VPLS | Virtual Private LAN Service |
| VPN | Virtual Private Network |
| WAN | Wide Area Network. |

DETAILED DESCRIPTION OF THE INVENTION

The present invention comprises an apparatus for and method of packet loss measurement for TLS connections in an MEN that overcomes the problems of the prior art. The mechanisms of the present invention overcomes the difficulty in providing packet loss measurements due to the fact that packets received by a TLS connection from a customer edge device over a UNI may be duplicated by the bridging domain within the TLS connection and sent out of more than one UNI towards other customer edge devices. The mechanism is operative to ensure that only one copy of each packet received is counted when exiting the TLS connection (unless dropped along the path due to congestion, etc.), so that the number of egress packets counted can be accurately compared with the number of ingress packets counted.

An example embodiment is provided to illustrate the packet loss measurement mechanism of the present invention. It is not intended, however, that the invention be limited to the configurations and embodiments described herein. It is appreciated that one skilled in the networking, electrical and/or software arts may apply the principles of the present invention to numerous other types of networking devices and network configurations as well, including other types of synchronous data streams and asynchronous transport networks without departing from the spirit and scope of the invention.

In particular, the invention is not limited to the use of TLS and VPLS. Further it is not limited to the use of MPLS transport tunnels in implementing pseudowires. It will be appreciated that other tunnels can be used including but not limited to GRE, L2TP, IPSEC, etc., as long as the originating provider edge device can be identified, since this is used in the source MAC learning process performed by the bridges. Further, the form of access from the customer to the provider network is not crucial to the invention.

Figure 1:
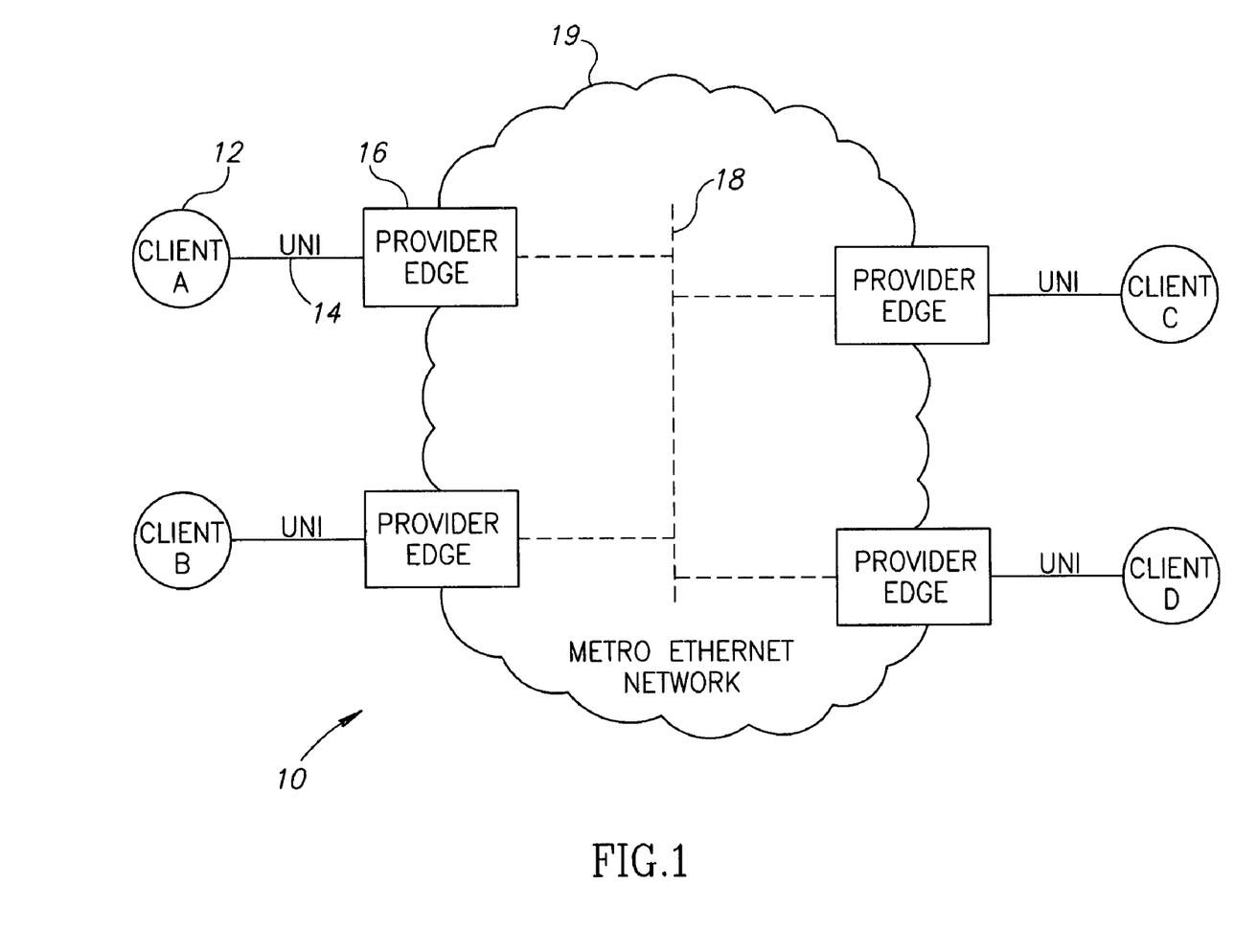
FIG. 1 is a block diagram illustrating an example metro Ethernet network providing transparent LAN services to a plurality of clients.

A block diagram illustrating an example metro Ethernet network providing transparent LAN services to a plurality of clients is shown in FIG. 1. The example network, generally referenced 10, comprises a plurality of clients 12, labeled client A through D, connected to a Metro Ethernet Network (MEN) 19. The clients are connected to the MEN via a plurality of provider edge devices 16. One or more TLS connections are configured as represented by the dashed lines 18 connecting the PE devices. The TLS is operative to perform the packet loss measurement mechanism of the present invention in addition to performing standard bridging functions.

The provider edge devices 16 are interconnected via pseudowires and appear as a single emulated LAN to the clients 12. The provider edge devices may be interconnected through additional core nodes that provide bridging between these pseudowires. Provider edge devices may also contain a bridging function between their UNIs and the pseudowires belonging to the TLS. Each device having TLS bridging functionality is adapted to learn remote MAC address (or MAC address and VLAN tag) to pseudowire associations from traffic received over these pseudo wires and to also learn source MAC address to user port associations from traffic received over user ports. One of two methods for provisioning a TLS is typically used: a management based method or signaling based method. With management based provisioning, a management entity allocates the bridging resources to be used at the different nodes and provisions the pseudowires between them. With signaling based provisioning, the provider edge device typically comprises an edge router capable of running a signaling protocol and/or routing protocols used to configure pseudowires. In addition, it is capable of configuring transport tunnels to other provider edge devices and transporting traffic over a pseudowire.

Synchronizer Selection

As discussed above, prior art networks and current standards do not provide a mechanism to measure packet loss in bridged networks such as TLS, VPLS, etc. The present invention provides a solution to this problem. A scheme is provided for gathering packet loss information from the endpoints of a connection. The packet and byte counters in the endpoints (i.e. provider edge devices) are read and the data is collected in order to calculate packet loss metrics. In order to have accurate readings of the counter data, the counter data from all endpoints of the connection is collected as much as possible at the same point in time.

Figure 2:
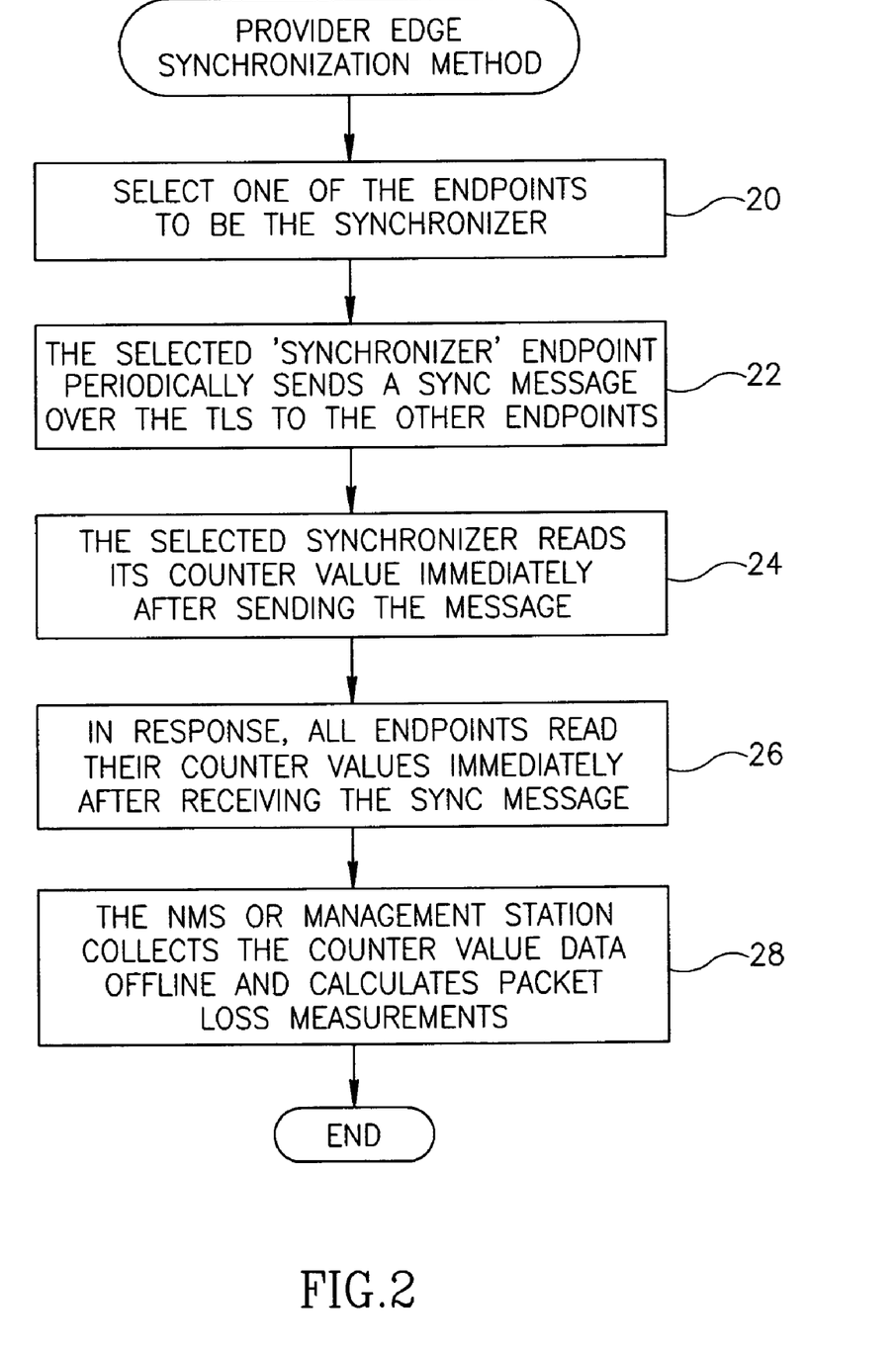
FIG. 2 is a flow diagram illustrating the provider edge synchronization method of the present invention.

A flow diagram illustrating the provider edge synchronization method of the present invention is shown in FIG. 2. One way to achieve the goal of accurate counter readings is to select a 'synchronizer' endpoint (step 20) that sends a SYNC message periodically to the other endpoints (step 22). The selected 'synchronizer' endpoint reads its own counters immediately after sending out the SYNC message (step 24). All other endpoints read their counters immediately after receiving the SYNC message (step 26). The counter values read are stored (i.e. recorded) by the endpoints until read by a management entity. A management entity such as a Network Management System (NMS) or management station coupled to the network then collects in an offline manner the counter values that were synchronously recorded previously (step 28).

The selection of the synchronizer endpoint can be performed in any suitable manner. In one example, the NMS decides periodically (or when deciding to initiate a measurement) which endpoint is to function as the 'synchronizer' endpoint. In a second example, an election protocol is used whereby, for example, the endpoint having the smallest (or largest) MAC/IP-address advertises itself as the 'synchronizer' as long as it does not hear from an endpoint with a smaller (or larger) MAC/IP-address.

Packet Loss Measurement in a MEN

Figure 3:
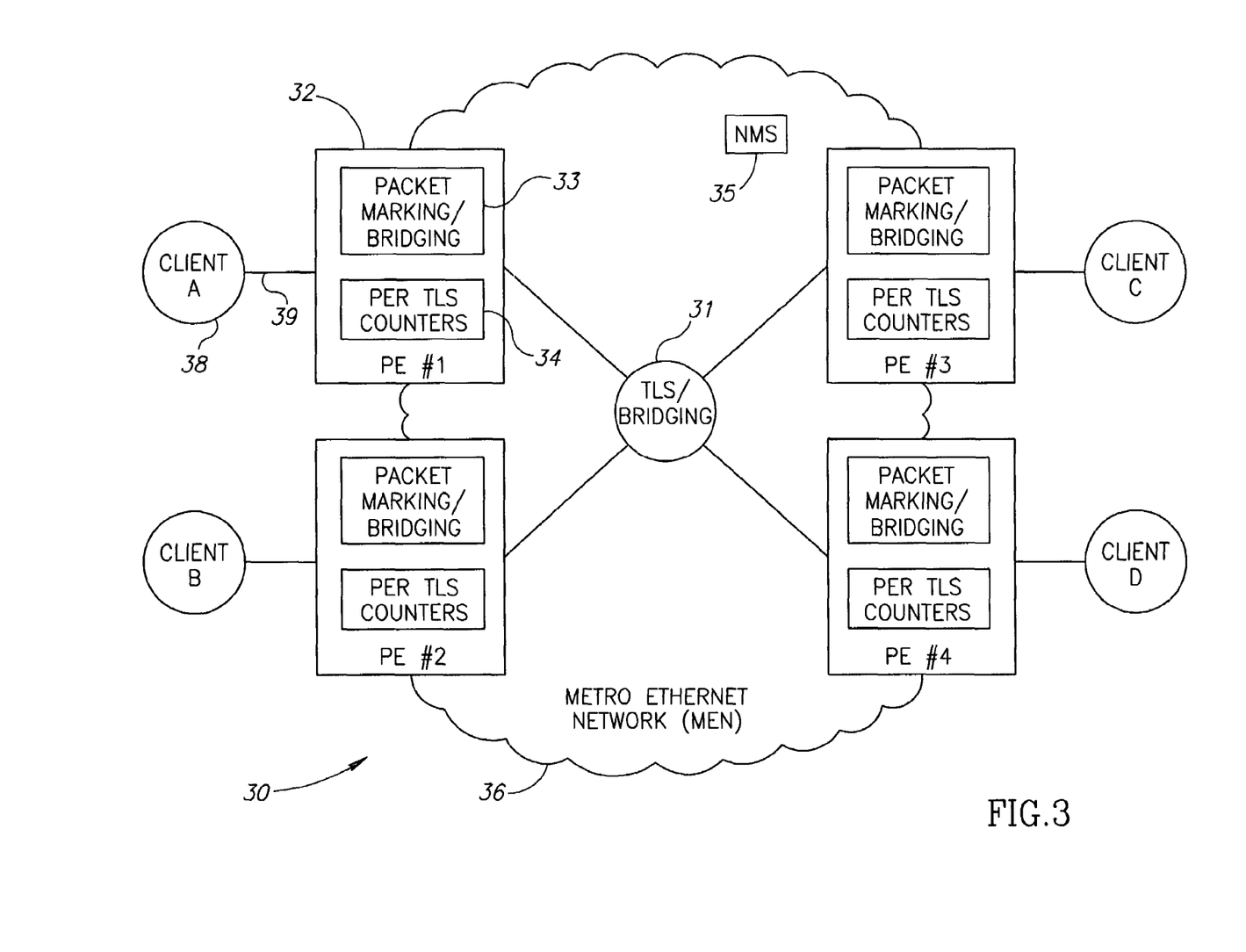
FIG. 3 is a block diagram illustrating an example metro Ethernet network incorporating the marking, counting and bridge forwarding mechanisms of the present invention.

A block diagram illustrating an example metro Ethernet network incorporating the marking, counting and bridge forwarding mechanisms of the present invention is shown in FIG. 3. The example network, generally referenced 30, comprises a plurality of clients 38, labeled client A through D, connected to a plurality of provider edge devices 32 that are part of a Metro Ethernet network (MEN) 36. In this example network, clients A and B are sending traffic while clients C and D are receiving traffic. Each client is connected to a provider edge device via a UNI 39. Client A is connected to PE #1, client B is connected to PE #2, client C is connected to PE #3 and client D is connected to PE #4. In other examples, a number of clients may connect to a single provider edge device through a number of UNIs.

The provider edge switches are configured to provide one or more TLS connections to clients. Standard bridging functions including any flooding or duplication of packets are performed by the bridges in the provider edge devices and the core switches (if any). The TLS and associated bridging functions are represented by the center circle 31 connecting the provider edge devices. In this example, the four provider edge devices are configured to provide a TLS connection between clients A, B C and D. An NMS 35 functions to configure the MEN and periodically collect counter data and provide packet loss measurements based thereon.

Each provider edge device comprises the packet loss measurement mechanism of the present invention. In particular, each provider edge device comprises a per TLS packet marking and bridging module 33 and per TLS counters 34 which include both packet and byte (i.e. octet) counters. If the provider edge device does not include a bridging function for a specific TLS, the marking and bridging module functions to simply mark all packets for counting. Core devices may also comprise a packet marking and bridging module for some or all of the TLS connections in the network.

As described hereinabove, the main problem with prior art packet loss estimation schemes is that when used with TLS, they do not provide accurate packet loss measurements. This is because the flooding and duplication of packets due to the destination MAC address being a broadcast/multicast address or not being in the forwarding database results in an unpredictable number of packet copies. In such a case, a packet that is counted once upon ingress to the network via one of the user ports will be counted multiple times as the packet is sent out over multiple user ports upon egress from the network. With packets that are unknown (i.e. those packets that are not found in the forwarding database of one or more bridging hops along the way), the problem is even worse because the device which counts the packet on ingress has no knowledge of whether the packet will be known or unknown to the one or more bridging hops along the way to its destination. It thus cannot know beforehand if the packet will be replicated and if so, how many copies will be generated.

In accordance with the invention, the packet counting process is organized such that each packet is counted exactly once upon ingress and exactly once at egress. Unknown packets are not necessarily counted at the egress of the port to which they should arrive, but rather at some "possible" destination port. This is achieved by marking (i.e. flagging) for counting only a single copy of each packet.

To implement this scheme a packet loss count bit or flag is added to each packet. The flag is adapted to indicate whether the particular packet should be counted on egress (i.e. exit) from the network or not. The marking (or flagging) of packets can be performed in any suitable manner. In one example, the multicast bit in the source MAC address field of the packet is used as the packet loss count flag. Before sending packets to the user, however, the source multicast bit should be set to zero, so that the user receives a standard packet which normally does not have the multicast bit set.

In a second example, suitable in case the invention is implemented over VPLS that uses "Martini" encapsulation as described in the IETF draft "Encapsulation Methods for Transport of Ethernet Frames Over IP/MPLS Networks", draft-ietf-pwe3-ethernet-encap-03.txt, one bit from the control word is used for the packet loss count flag. In a third example, another existing bit known as the Canonical Format Indicator (CFI) bit in the 802.1Q VLAN tag field of packets can also be used to mark packets.

A key feature of the present invention is to ensure that each packet is counted only once upon exiting the network. This is assured by marking (i.e. flagging) only a single copy of each packet that enters the network. Only marked packets are counted upon exiting from the network. It is appreciated that any number of counters may be used with the packet loss measurement mechanism of the present invention. In addition, other counters, not related to the invention may also be used. These counters, however, may count unmarked packets as well.

Note that throughout this document, the terms marked and flagged are defined to indicate that a special bit, referred to as a packet loss count bit, in the packet is set thus indicating that the packet is to be counted upon egress from the network. The terms unmarked and unflagged are defined to indicate that the packet loss count bit is cleared in the packet thus indicating that the packets are not to be counted upon egress from the network. The terms marked, flagged, unmarked and unflagged are defined as above regardless of how the marking information (e.g., packet loss count bit) is encoded in the packet. Examples described above include the multicast bit of the source MAC address field, a bit in the control word of a VPLS packet, or use of any other designated bit for marking purposes. Additional examples include encoding schemes other than designating a bit for that purpose, for example, a scheme in which a codeword is used, having a number of code values each serving a different purpose, where a subset of the code values indicate that the packet is to be counted at the egress.

Thus only a single copy of each received packet is marked at ingress regardless of the number of packet copies generated. The marked packet is counted once at ingress by an ingress counter and once upon egress by an egress counter. The packet counting is performed in the provider edge devices and not in the internal switches because of scalability (the number of counters required increases with the number of connections) and because they would not provide useful information (it is desirable to know how many packets made it through the network).

Duplicate packets are not generated for known unicast packets. Thus for each known unicast packet, only a single packet is marked and counted at ingress and egress. For unknown unicast, broadcast and multicast packets, however, this is not the case and an unpredictable number of packet copies may be made by the TLS bridges along the path. As assumption made by the invention is that duplicate traffic is a relatively small percentage of the total traffic. This coupled with less than perfect synchronization yields less then perfect accuracy of the packet loss measurements. The goal, however, of not permitting duplicated packets to interfere with measurement of packet loss is met by the present invention. The invention works to trade a bit of accuracy for the ability to handle duplicate packets in calculating packet loss measurements. The mechanism is adapted such that no packet losses are reported that did not actually occur.

After synchronization, the management entity collects the ingress and egress counter data from all the endpoints and calculates the packet loss metrics. The ingress counter readings are summed to generate an ingress counter sum and the egress counter readings are summed to generate an egress counter sum. Two such phases of synchronization, reading, and summing of counters are performed at two different points in time in order to calculate relative change (or delta) information. The packet loss calculated will be the packet loss during the interval of time between these two phases. An ingress counter delta is calculated by subtracting the first phase ingress counter sum from the second-phase ingress counter sum. Similarly, an egress counter delta is calculated by subtracting the first phase egress counter sum from the second phase egress counter sum. The egress counter delta is then subtracted from the ingress counter delta to yield the packet loss. The packet loss measurements can be provided to network operators, forwarded to customers, stored to create historical performance charts, etc.

Octet loss measurements are calculated in a similar manner. Two phases of synchronization, reading, and summing of octet counters are performed at two different points in time in order to calculate relative change (or delta) information. The octet loss calculated will be the octet loss during the interval of time between these two phases. An ingress counter delta is calculated by subtracting the first phase ingress counter sum from the second phase ingress counter sum. Similarly, an egress counter delta is calculated by subtracting the first phase egress counter sum from the second phase egress counter sum. The egress counter delta is then subtracted from the ingress counter delta to yield the octet loss. The octet loss measurements can be provided to network operators, forwarded to customers, stored to create historical performance charts, etc.

Note that the ingress and egress counters maintained by the provider edge devices are implemented on a per TLS basis. A separate set of ingress and egress packet and/or byte counters are maintained for each TLS. Ingress packet counting is performed using CIR packet/octet counters at the user edge ports in the provider edge devices. These counters are per TLS ingress counters for CIR packets/octets. Thus, a pair of counters is maintained at each user edge port or device for each TLS the port or device is a member of. An additional per TLS counter pair is defined at the egress of the TLS endpoints. This counter pair is adapted to count only the CIR egress packets/octets that are marked. In an alternative embodiment the egress counter comprises a packet counter and an octet counter per each quality-of-service class (e.g., per priority and/or per discard-eligibility class).

Packet Forwarding Method #1

Single Bit

As described above, the bridges in the provider edge devices and core switches functions to forward the packet according to standard 802.1 bridging (with an adaptation for TLS, i.e. bridging between pseudowires and supporting multiple broadcast domains) or any other bridging method between edge ports and pseudowires, e.g. split-horizon, etc. In addition, the bridges are adapted to implement the packet loss measurement mechanism of the present invention. In particular, they are modified to handle marked packets differently than unmarked packets. The bridges are adapted to ensure that only a single copy of a packet to be duplicated is marked while the remainder are forwarded unmarked.

Figure 4:
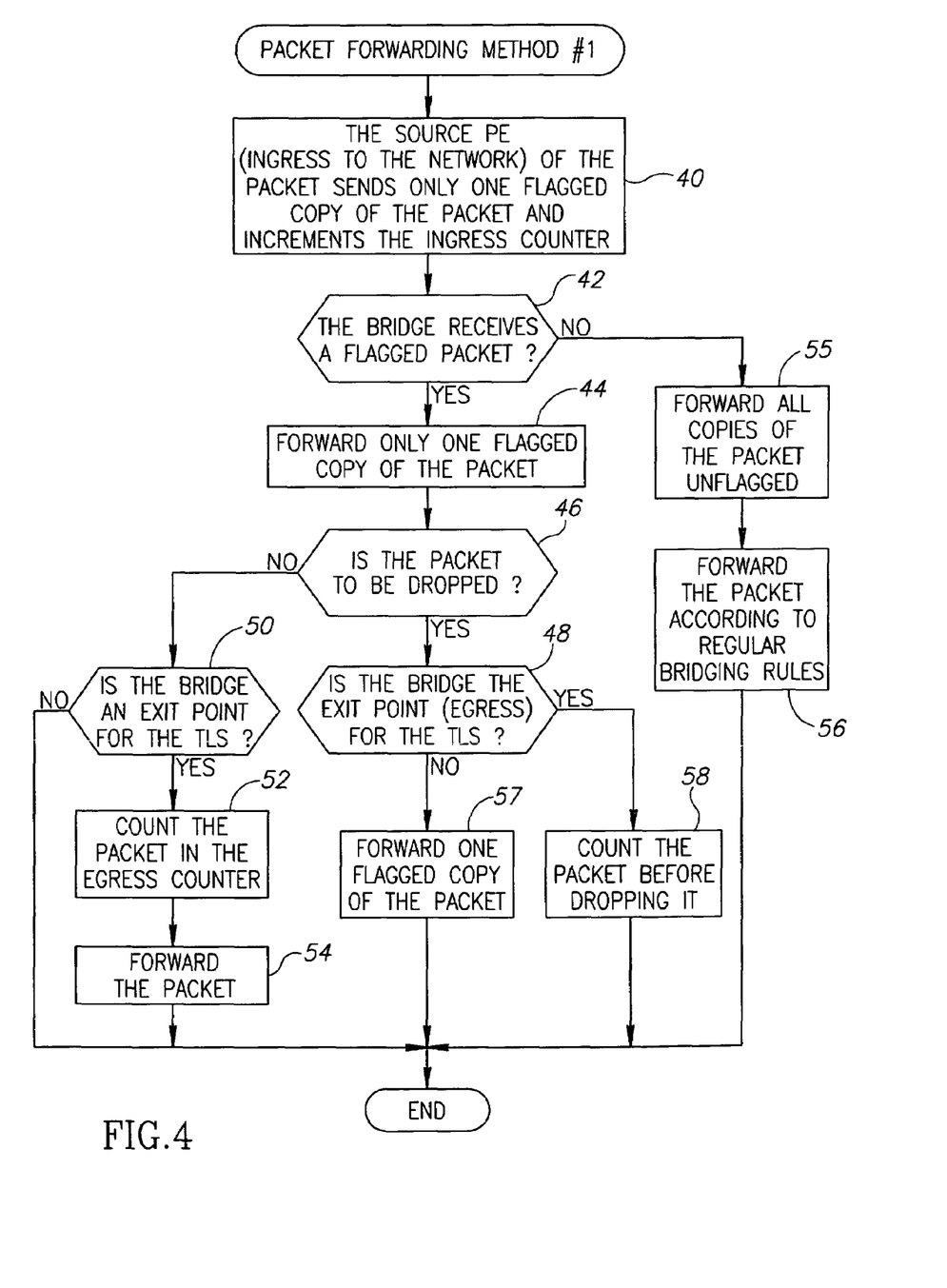
FIG. 4 is a flow diagram illustrating a first packet forwarding method in accordance with the present invention.

The first packet forwarding method of the present invention will now be described in more detail. A flow diagram illustrating a first packet forwarding method in accordance with the present invention is shown in FIG. 4. The source provider edge device (i.e. ingress to the network) that receives the packet from the client, forwards only a single marked copy of the packet and increments the ingress counter accordingly (step 40). If the source sends a single copy of the packet, this copy is marked. If the source sends multiple copies of the packet, only one of them is marked and the others should be unmarked.

A bridge that performs bridging as part of the TLS receives packets and examines them to see whether they are marked or not. If an unmarked packet is received (step 42), then all copies of the packets forwarded are unmarked (step 55) and the packet is forwarded according to standard bridging rules (step 56).

If, however, the bridge receives a marked packet (step 42), only one marked copy of the packet is forwarded (step 44). If the bridge needs to duplicate the packet, it forwards one marked copy and the rest are unmarked.

If the packet is to be dropped (step 46) and the bridge is the exit point (egress) for the TLS (step 48), then the packet is counted by the egress counter of the specific TLS before the packet is dropped (step 58). If the bridge is not an exit point for the TLS, one marked copy of the packet is forwarded (step 57). If the packet is not to be dropped (step 46) and the bridge is an exit point (UNI) for the TLS (step 50), the packet is counted by the egress counter (step 52) and the packet is forwarded (step 54).

Packet Forwarding Method #2

Multiple Bit

In a second alternative embodiment of the present invention, more accurate packet loss measurements are obtained by replacing the single packet loss count bit of the first embodiment with a multiple bit duplication field. The field is initialized to a value and the ingress counter is updated. The duplication field has more granularity than a single bit. The field represents the percentage a particular packet represents from the entire number of copies made of the original packet. Each time the packet is to be duplicated, the field is divided by the number of duplicates to be forwarded. The divided value is inserted into the duplication field of each packet. Upon egress, the egress counter is incremented by the value of the field.

For example, consider a duplication field that holds numbers from 0 to 100. The number can be logically viewed as the percentage that the specific packet represents from the entire number of copies of the original packet. The duplication field is initialized to 100 and the ingress counter is incremented by 100. If it is to be duplicated in a bridge, the current value of the duplication field is divided between the copies. For example, consider a packet to be duplicated four times at the first bridge hop. Each copy will be forwarded with the value 25 in its duplication field. At the next hop, one of the copies gets duplicated again, this time creating two copies. One of these two copies will be forwarded with the value 12 and the other with the value 13 in its duplication field, respectively.

An advantage of this embodiment is that meaningful packet loss measurements can be obtained for duplicate packets. Rather than selecting one packet from among many to represent all duplicate packets, this scheme attempts to count each and every duplicated packet thus providing better packet loss measurement for duplicated packets.

Figure 5:
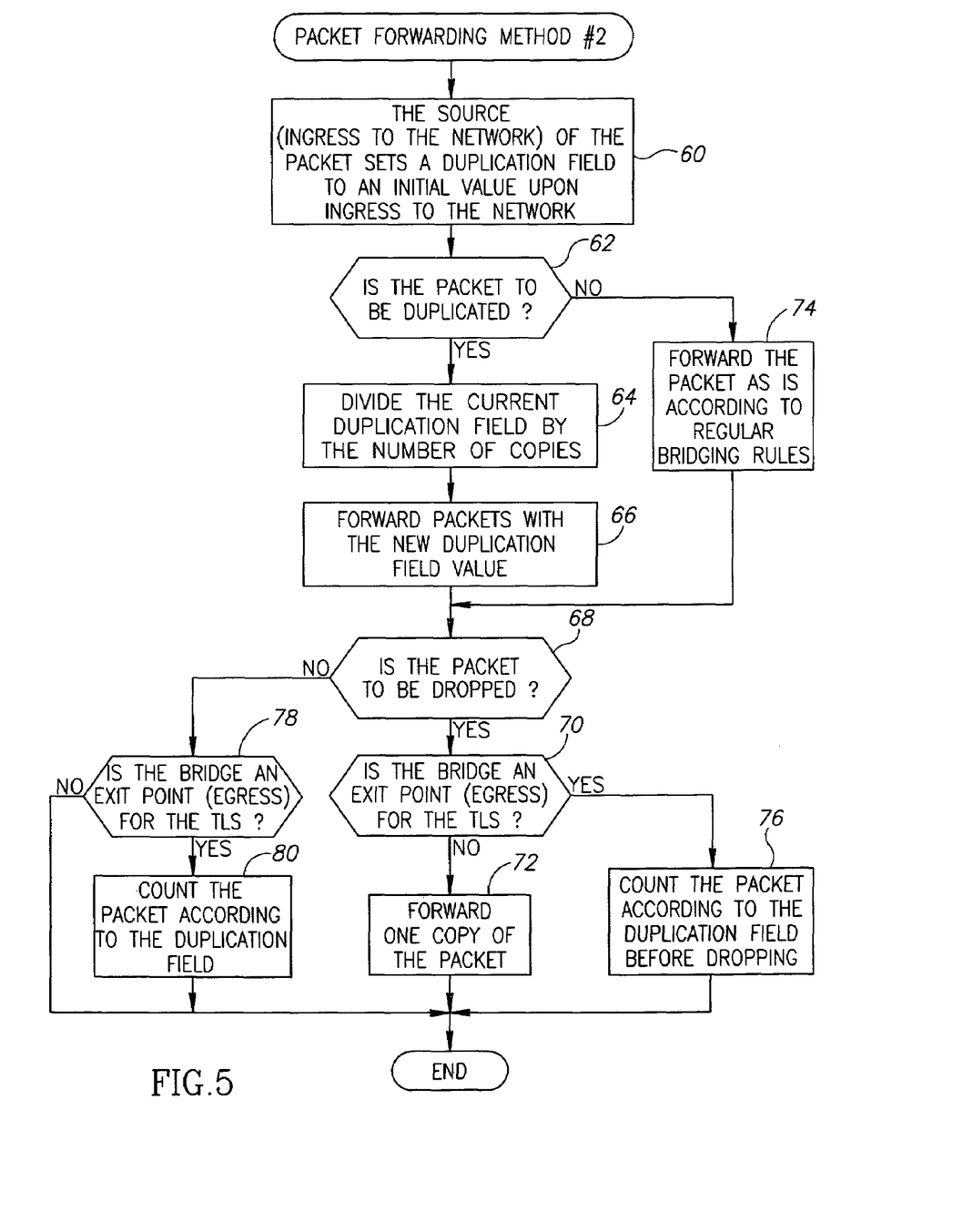
FIG. 5 is a flow diagram illustrating a second packet forwarding method in accordance with the present invention.

A flow diagram illustrating a second packet forwarding method in accordance with the present invention is shown in FIG. 5. The source provider edge device (i.e. ingress to the network) that receives the packet from the client sets the duplication field to an initial value upon ingress to the network (step 60). A bridge that is part of the TLS receives packets and examines each packet to see whether it is to be duplicated (step 62). If the packet is not to be duplicated, the packet is forwarded as is according to standard bridging rules (step 74) and the method continues with step 68.

If, however, the packet is to be duplicated at a bridge (step 62), the current value of the duplication field is divided by the number of copies to be made (step 64). The packets are then forwarded with the new value of the duplication field (step 66).

If the packet is to be dropped (step 68) and the bridge is the exit point (egress) for the TLS (e.g., contains a UNI for that TLS) (step 70), then the packet is counted by the egress counter in accordance to the duplication field of the packet being dropped (step 76). If the bridge is not an exit point for the TLS, one copy of the packet is forwarded (step 72). If the packet is not to be dropped (step 68) and the bridge is an exit point (egress) for the TLS (step 78), the packet is counted by the egress counter in accordance to the duplication field (step 80).

It is important to note that the mechanism of the invention is configurable on a per TLS connection basis whether to perform the marking and forwarding of packets as described above. If a connection is configured to not utilize the mechanism of the present invention (i.e. not be subject to the packet manipulations described hereinabove), then packet/octet loss measurements will not be generated for that connection, and the packets of that connection will pass untouched through the entire network. In addition, a per user-edge (UNI) port or per TLS mode of operation is provided to indicate whether a particular port should pass marked packets received from the client through the UNI, or drop them.

Provider Edge Switch Embodiment

A network device can be adapted to incorporate the packet loss measurement mechanism of the present invention. Hardware means and/or software means adapted to execute the mechanism may be incorporated within a network device such as a core switch, provider edge switch, Network Management System, Label Switching Router (LSR), Ethernet LAN switch, network switch or any other wired or wireless network device. The device may be constructed using any combination of hardware and/or software.

Figure 6:
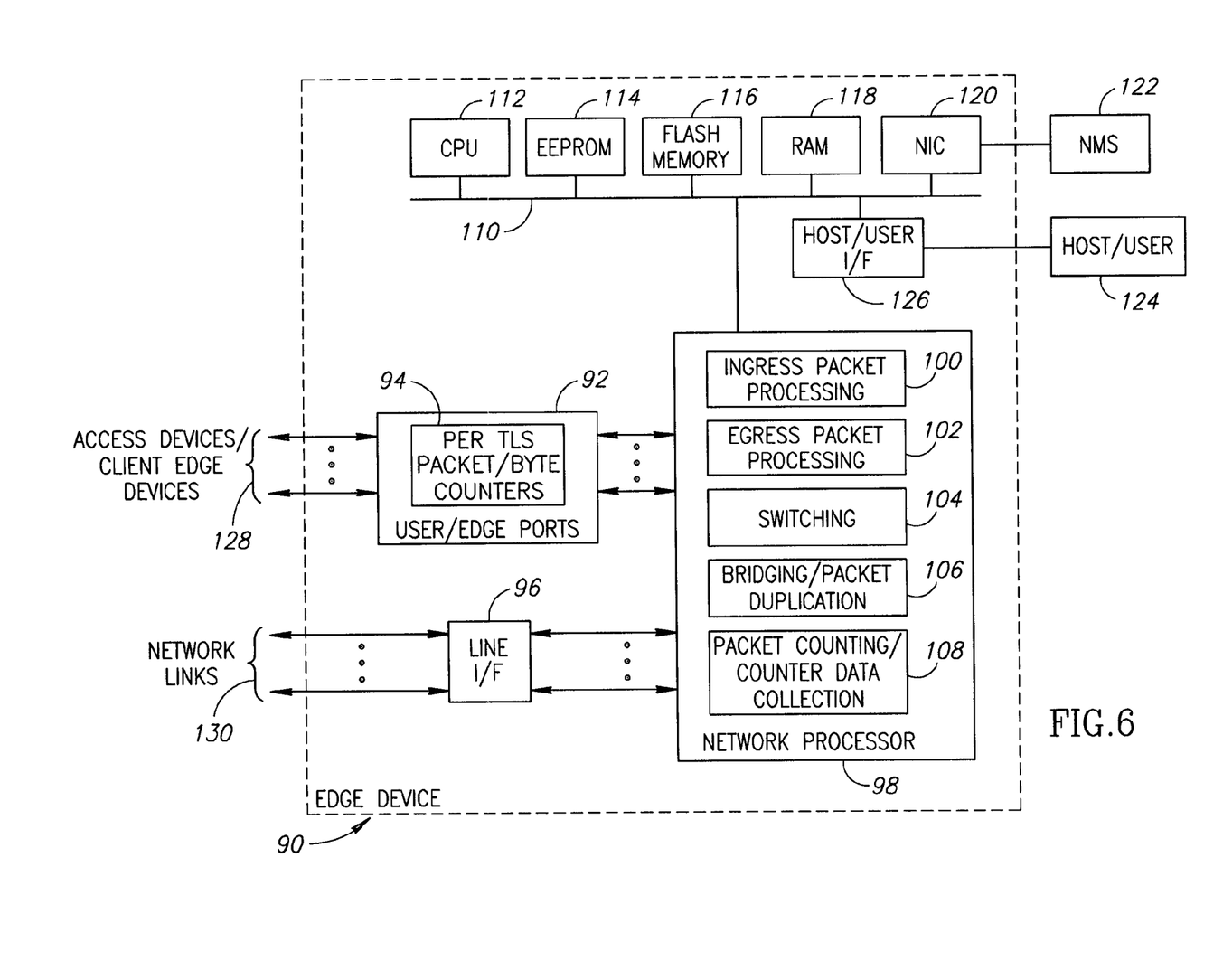
FIG. 6 is a block diagram of an edge switch incorporating the packet loss measurement mechanism of the present invention.

A block diagram of a provider edge switch incorporating the packet loss measurement mechanism of the present invention is shown in FIG. 6. The provider edge switch, generally referenced 90, comprises at its core a network processor 98, link or network interface ports 96, edge or user ports 92, a network interface 120 for interfacing the provider edge switch to an NMS 122, a central processor 112, e.g., CPU, and both volatile and non-volatile memory including RAM memory 118 for storing data and application program code, Flash memory 116 for storing boot and application code and EEPROM 114 for storing configuration data. The CPU communicates to the network processor, memory peripherals and other support devices via a bus 110.

The provider edge switch 90 comprises a user side and a network side. The one or more line interface cards containing network ports 96 provide the PHY interface to two-way communication links 130. As an example, the line interface cards may be adapted to interface to any combination of the following communication links: any variety of copper or optical based Ethernet, Token Ring, FDDI, SONET/SDH, ATM, RPR.

A plurality of edge ports 92 is provided for connecting directly or indirectly through access/aggregation devices to a plurality of users or customer/client edge devices via links 128. The client edge side interfaces to the user or client edge device via any suitable type of interface, e.g., Gigabit Ethernet (GE), Fast Ethernet (FE), PDH interface (e.g., T1/E1), etc. Likewise, the network side interfaces to other edge switches or the core network via any suitable interface such as Optical Ethernet (e.g., 1GE, 10GE, etc.), TDM, RPR, etc. The user/edge ports comprise per TLS pairs of ingress and egress counters as described hereinabove. Note that the counters may alternatively be maintained in the network processor depending on the implementation. Each TLS connection has associated counters for counting packets and bytes for ingress and egress traffic. In all cases and in accordance with the invention, only marked packets are counted at ingress or egress.

A plurality of provider edge switches may be connected to each other to form a stack whereby the provider edge switches at the ends of the stack are connected to core switches. In this case, connections may be built using both VLAN and MPLS based technology. Alternatively, the network may comprise only provider edge switches whereby a plurality of provider edge switches are connected in a ring topology.

The network processor 98 implements the switching fabric (switching block 104) for providing the switching functionality of the device. Depending on the specific implementation, the switching fabric may comprise, for example, hardware for performing VLAN tagging, MPLS, Frame Relay, ATM switching, CSIX or any other fabric to network interface protocol. The network processor includes one or more packet processing engines (PPE) that comprises an ingress packet processor 100 and an egress packet processor 102. The network processor also comprises timestamp circuits, clock circuits, memory, counters and CPU interface (not shown), means for performing Hello (or availability measurement) protocol processing (part of this capability may reside in the CPU as well). The network processor may be implemented as a microcontroller, microprocessor, microcomputer, ASIC core, FPGA core, central processing unit (CPU) or digital signal processor (DSP) or any other suitable computing means.

Module 106 provides bridging and packet duplication services in accordance with the invention as described in more detail hereinabove. Packet counting and data collection services in accordance with the invention as described hereinabove are also provided via module 108.

The edge switch also comprises a NIC 120 for providing an out of band interface for connecting to external entities such as a craft for local maintenance and configuration purposes, an NMS for centralized provisioning, administration and control or a Local Area Network (LAN). The network device may comprise additional interfaces, such as a serial interface for connecting to a PC for configuration purposes.

The central processor 112 implements the major functionality of the provider edge switch including higher software layer processing. Note that the central processor may be implemented in any suitable manner such as a microcontroller, microprocessor, microcomputer, ASIC core, FPGA core, central processing unit (CPU) or digital signal processor (DSP) or any other computing means.

The client edge ports and network ports may be implemented on one or more line interface cards that provide the PHY interface to bidirectional communication links, in addition to the MAC interface. Note that the invention is not limited to any particular line interface type or link speed. In addition, the invention is not limited to any particular number of user or network ports, as any number of links of each type may be used. Further, the line interface cards may be adapted to interface to any type of communication links such as any variety of copper or optical based Ethernet, Token Ring, FDDI, SONET/SDH, PDH, ATM, RPR, etc.

The network device also comprises an optional user interface adapted to respond to user inputs and provide feedback and other status information. A host/user interface 126 enables communication with a user or host-computing device 124. The host may be adapted to configure, control and maintain the operation of the device. The device may also comprise magnetic storage device means for storing application programs and data.

The network device comprises computer readable storage medium for storing program code and data which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Note that a network core device may have the same structure as a provider edge device, except for example, not having a user/edge (UNI) port for connecting to client and/or access devices, and having a higher port density and bandwidth capacity.

Software operative to implement the functionality of the packet loss measurement mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform mechanisms and methods of the present invention or any portion thereof may also reside, in whole or in part, in the static or dynamic main memories or in firmware within the processor of the switch (i.e. within microcontroller, microprocessor, microcomputer, DSP, etc. internal memory).

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of measuring packet and/or octet loss for use in a bridging domain, said method comprising the steps of:
receiving a plurality of packets from a source;
marking, at a switch, a received packet if only one copy of the packet is received;
marking, at said switch, only a single copy of a received packet if more than one copy of a packet is received, wherein remaining copies of the received packet are unmarked;
counting, at said switch, only marked packets at ingress;
receiving unmarked packets at a bridge and forwarding any copies of unmarked packets as unmarked;
receiving marked packets at said bridge and forwarding only a single copy of a marked packet as marked wherein all remaining copies of the marked packet are forwarded as unmarked; and
counting only marked packets at egress.

2. The method according to claim 1, wherein said bridging domain comprises a Transparent LAN Services (TLS) connection in a metro Ethernet network (MEN).

3. The method according to claim 1, wherein said bridging domain comprises a plurality of Virtual LAN domains.

4. The method according to claim 1, further comprising the step of forwarding one marked copy of a packet if the packet is to be dropped and is at a point that is not an exit point from said bridging domain.

5. The method according to claim 1, further comprising the step of counting a packet with an egress counter and then dropping said packet if said packet is to be dropped and is at a point that is an exit point from said bridging domain.

6. The method according to claim 1, wherein an ingress counter comprises a packet counter and an octet counter.

7. The method according to claim 1, wherein an egress counter comprises a packet counter and an octet counter.

8. The method according to claim 1, wherein an egress counter comprises a packet counter and octet counter pair per quality-of-service class.

9. The method according to claim 1, wherein said step of marking comprises the step of setting a multicast bit in a source Media Access Control (MAC) address field of a packet.

10. The method according to claim 1, wherein said step of marking comprises the step of setting a Cononical Format Indicator (CFI) bit in a 802.1Q Virtual LAN (VLAN) tag field of a packet.

11. The method according to claim 1, wherein said step of marking comprises the step of setting a bit in a control word portion of a packet sent over a Virtual Private LAN Service (VPLS) connection.

12. The method according to claim 1, further comprising the steps of:
synchronizing the collection of counter data from edge devices that are part of a bridging domain;
collecting counter data from said edge devices; and
calculating losses per bridging domain connection utilizing said counter data.

13. The method according to claim 12, wherein said step of calculating losses comprises the step of calculating packet losses, said step of calculating packet losses comprising the steps of:
summing all ingress packet counter readings of a first phase to generate a first phase ingress packet sum;
summing all egress packet counter readings of said first phase to generate a first phase egress packet sum;
summing all ingress packet counter readings of a second phase to generate a second phase ingress packet sum;
summing all egress packet counter readings of said second phase to generate a second phase egress packet sum;
subtracting said first phase ingress packet sum from said second phase ingress packet sum to yield an ingress packet delta;
subtracting said first phase egress packet sum from said second phase egress packet sum to yield an egress packet delta; and
subtracting said egress packet delta from said ingress packet delta to yield said packet loss measurement.

14. The method according to claim 12, wherein said step of calculating losses comprises the step of calculating octet losses, said step of calculating octet losses comprising the steps of:
summing all ingress octet counter readings of a first phase to generate a first phase ingress octet sum;
summing all egress octet counter readings of said first phase to generate a first phase egress octet sum;
summing all ingress octet counter readings of a second phase to generate a second phase ingress octet sum;
summing all egress octet counter readings of said second phase to generate a second phase egress octet sum;
subtracting said first phase ingress octet sum from said second phase ingress octet sum to yield an ingress octet delta;
subtracting said first phase egress octet sum from said second phase egress octet sum to yield an egress octet delta; and
subtracting said egress octet delta from said ingress octet delta to yield said octet loss measurement.

15. An apparatus for measuring packet loss for Transparent LAN Services (TLS) connections in a metro Ethernet network (MEN), comprising:
packet receiving means for receiving packets from a client;
marking means for marking a received packet if only one copy of the packet is received and for marking only a single copy of a received packet if more than one copy of a packet is received, wherein remaining copies of the received packet are unmarked;
an ingress counter operative to be incremented once for each marked packet received at ingress;
a bridge operative to forward all unmarked packets and copies of unmarked packets as unmarked, and to forward only a single copy of a marked packet as marked, wherein remaining copies of the marked packet are forwarded as unmarked; and
an egress counter operative to be incremented only for marked packets exiting a TLS connection.

16. The apparatus according to claim 15, wherein said bridge further comprises means for forwarding one marked copy of a packet if the packet is to be dropped and is at a point that is not an exit point from said TLS connection.

17. The apparatus according to claim 15, wherein said bridge further comprises means for counting a packet via said egress counter and then dropping said packet if said packet is to be dropped and is at a point that is an exit point from said TLS connection.

18. The apparatus according to claim 15, wherein said ingress counter comprises a packet counter and an octet counter.

19. The apparatus according to claim 15, wherein said egress counter comprises a packet counter and an octet counter.

20. The apparatus according to claim 15, wherein said marking means comprises means for setting a multicast bit in a source Media Access Control (MAC) address field of a packet.

21. The apparatus according to claim 15, wherein said marking means comprises means for setting a bit in a control word portion of a packet sent over a Virtual Private LAN Service (VPLS) connection.

22. The apparatus according to claim 15, further comprising:
means for synchronizing the collection of counter data from provider edge devices that are part of a TLS connection;
means for collecting counter data from said provider edge devices; and
means for calculating losses per TLS connection utilizing said counter data.

23. The apparatus according to claim 22, wherein said means for calculating losses comprises means for calculating packet loss, said means for calculating packet loss comprises:
means for summing all ingress packet counter readings of a first phase to generate a first phase ingress packet sum;
means for summing all egress packet counter readings of said first phase to generate a first phase egress packet sum;
means for summing all ingress packet counter readings of a second phase to generate a second phase ingress packet sum;
means for summing all egress packet counter readings of said second phase to generate a second phase egress packet sum;
means for subtracting said first phase ingress packet sum from said second phase ingress packet sum to yield an ingress packet delta;

means for subtracting said first phase egress packet sum from said second phase egress packet sum to yield an egress packet delta; and means for subtracting said egress packet delta from said ingress packet delta to yield said packet loss measurement.

24. The apparatus according to claim 22, wherein said means for calculating losses comprises means for calculating octet loss, said means for calculating octet loss comprises:
means for summing all ingress octet counter readings of a first phase to generate a first phase ingress octet sum;
means for summing all egress octet counter readings of said first phase to generate a first phase egress octet sum;
means for summing all ingress octet counter readings of a second phase to generate a second phase ingress octet sum;
means for summing all egress octet counter readings of said second phase to generate a second phase egress octet sum;
means for subtracting said first phase ingress octet sum from said second phase ingress octet sum to yield an ingress octet delta;
means for subtracting said first phase egress octet sum from said second phase egress octet sum to yield an egress octet delta; and
means for subtracting said egress octet delta from said ingress octet delta to yield said octet loss measurement.

25. A bridge for forwarding marked packets over Transparent LAN Services (TLS) connections in a metro Ethernet network (MEN), comprising:
packet receiving means for receiving a plurality of packets from a source;
first means for marking a received packet if only one copy of the packet is received and for marking only a single copy of a received packet if more than one copy of a packet is received, wherein remaining copies of the received packet are unmarked;
second means for counting only marked packets at ingress;
third means for receiving unmarked packets at a bridge and forwarding any copies of unmarked packets as unmarked;
fourth means for receiving marked packets at said bridge and forwarding only a single copy of a marked packet as marked wherein all remaining copies of the marked packet are forwarded as unmarked; and
fifth for counting only marked packets at egress.

26. An edge switch for use in an Ethernet based network, comprising:
a plurality of user ports for interfacing said edge switch to one or more users;
a plurality of network ports for interfacing said edge switch to one or more communication links;
a packet processor comprising ingress packet processing means and egress packet processing means;
a loss measurement module for measuring packet and/or octet loss for Transparent LAN Services (TLS) connections in a metro Ethernet network (MEN), said loss measurement module comprising:
marking means for marking a received packet if only one copy of the packet is received and for marking only a single copy of a received packet if more than one copy of a packet is received, wherein remaining copies of the received packet are unmarked;
an ingress counter operative to be incremented once for each marked packet received at ingress;
a bridge operative to forward all unmarked packets and copies of unmarked packets as unmarked, and to forward only a single copy of a marked packet as marked, wherein remaining copies of the marked packet are forwarded as unmarked; and
an egress counter operative to be incremented only for marked packets exiting a TLS connection.

27. The switch according to claim 26, further comprising:
means for synchronizing the collection of counter data from edge switches that are part of a TLS connection; and
means for providing counter data to an external collection entity for calculation of packet and/or octet loss measurements utilizing said counter data.

28. The switch according to claim 26, further comprising means for calculating packet loss, comprising:
means for summing all ingress packet counter readings of a first phase to generate a first phase ingress packet sum;
means for summing all egress packet counter readings of said first phase to generate a first phase egress packet sum;
means for summing all ingress packet counter readings of a second phase to generate a second phase ingress packet sum;
means for summing all egress packet counter readings of said second phase to generate a second phase egress packet sum;
means for subtracting said first phase ingress packet sum from said second phase ingress packet sum to yield an ingress packet delta;
means for subtracting said first phase egress packet sum from said second phase egress packet sum to yield an egress packet delta; and
means for subtracting said egress packet delta from said ingress packet delta to yield said packet loss measurement.

29. The switch according to claim 26, further comprising means for calculating octet loss comprising:
means for summing all ingress octet counter readings of a first phase to generate a first phase ingress octet sum;
means for summing all egress octet counter readings of said first phase to generate a first phase egress octet sum;
means for summing all ingress octet counter readings of a second phase to generate a second phase ingress octet sum;
means for summing all egress octet counter readings of said second phase to generate a second phase egress octet sum;
means for subtracting said first phase ingress octet sum from said second phase ingress octet sum to yield an ingress octet delta;
means for subtracting said first phase egress octet sum from said second phase egress octet sum to yield an egress octet delta; and
means for subtracting said egress octet delta from said ingress octet delta to yield said octet loss measurement.

30. An edge switch for use in an Ethernet based network, comprising:
a plurality of user ports for interfacing said edge switch to one or more users;
a plurality of network ports operative to interface said edge switch to one or more communication links;

a packet processor comprising ingress packet processing means and egress packet processing means;

a loss measurement module operative to measure packet and/or octet loss for Transparent LAN Services (TLS) connections in a metro Ethernet network (MEN), said loss measurement module comprising:

marking means for marking a received packet if only one copy of the packet is received and for marking only a single copy of a received packet if more than one copy of a packet is received, wherein remaining copies of the received packet are unmarked;

an ingress counter operative to be incremented once for each marked packet received at ingress;

an egress counter operative to be incremented only for marked packets exiting a TLS connection.

* * * * *